US008548527B2

(12) United States Patent (10) Patent No.: US 8,548,527 B2
Otaka et al. (45) Date of Patent: Oct. 1, 2013

(54) MOBILE COMMUNICATION TERMINAL

(75) Inventors: Osamu Otaka, Tokyo (JP); Hideyuki Ikeda, Kanagawa (JP)

(73) Assignee: Vodafone Group PLC, Newbury, Berkshire (GB)

( * ) Notice: Subject to any disclaimer, the term of this patent is extended or adjusted under 35 U.S.C. 154(b) by 1273 days.

(21) Appl. No.: 11/578,395

(22) PCT Filed: Mar. 23, 2005

(86) PCT No.: PCT/JP2005/005199
§ 371 (c)(1),
(2), (4) Date: Jul. 26, 2007

(87) PCT Pub. No.: WO2005/101806
PCT Pub. Date: Oct. 27, 2005

(65) Prior Publication Data
US 2008/0153550 A1 Jun. 26, 2008

(30) Foreign Application Priority Data
Apr. 16, 2004 (JP) .................................. 2004-121772

(51) Int. Cl.
*H04B 1/38* (2006.01)
*H04M 1/00* (2006.01)
*G06F 17/00* (2006.01)
*G06F 3/14* (2006.01)
*G09G 5/02* (2006.01)

(52) U.S. Cl.
USPC ........... 455/566; 345/418; 345/589; 345/660; 715/800; 715/864

(58) Field of Classification Search
USPC ................. 345/592, 671; 715/749, 800, 801, 715/864; 455/566
See application file for complete search history.

(56) References Cited

U.S. PATENT DOCUMENTS

| 7,277,878 | B2 * | 10/2007 | Blair et al. .............................. 1/1 |
| 7,346,856 | B2 * | 3/2008 | Nguyen et al. ................. 715/800 |
| 7,511,723 | B2 * | 3/2009 | Sylthe et al. ................... 345/671 |
| 2001/0011364 | A1 * | 8/2001 | Stoub ............................... 717/1 |

(Continued)

FOREIGN PATENT DOCUMENTS

EP 1158484 A2 11/2001
EP 1 445 691 A1 8/2004

(Continued)

*Primary Examiner* — Matthew Sams
(74) *Attorney, Agent, or Firm* — Muirhead and Saturnelli, LLC (57) ABSTRACT

The present invention provides a mobile communication terminal that can execute, by designation by an application program, novel image conversions that cannot be executed in the conventional mobile communication terminal.

The mobile communication terminal 20 includes application program execution managing means 211, displaying means 12, image display controlling means 213 and image conversion processing means 214. The image conversion processing means selectively executes, based on conversion-contents designating information received from the application program execution managing means, at least one drawing-type image conversion process of an enlargement process, a contraction process, and a pseudo semi-transparent process for partial hiding by use of a transmissive mask pattern, for the image data subject to image conversion process stored in the image data storage means 211*b*. The application program execution managing means 211 sends conversion-contents designating information designated by an application program in execution to the image conversion processing means, generates the drawing data from image data after a conversion process returned from the image conversion processing means, and stores the same in the drawing data storage unit 211*a*.

13 Claims, 9 Drawing Sheets

(56) References Cited

U.S. PATENT DOCUMENTS

| | | | |
|---|---|---|---|
| 2002/0044122 A1 | 4/2002 | Kuwata et al. | |
| 2003/0090497 A1 | 5/2003 | Yoshioka | |
| 2003/0151600 A1* | 8/2003 | Takeuchi et al. | 345/204 |
| 2004/0193638 A1 | 9/2004 | Taniguchi et al. | |
| 2005/0114788 A1* | 5/2005 | Fabritius | 715/767 |
| 2005/0138568 A1* | 6/2005 | Gilfix | 715/788 |
| 2007/0150829 A1* | 6/2007 | Eschbach et al. | 715/781 |
| 2007/0174785 A1* | 7/2007 | Perttula | 715/800 |

FOREIGN PATENT DOCUMENTS

| | | |
|---|---|---|
| JP | 2000-187595 A | 7/2000 |
| JP | 2000-347867 A | 12/2000 |
| JP | 2002-042118 A | 2/2002 |
| JP | 2002042118 A | 2/2002 |
| JP | 2002-182638 A | 6/2002 |
| JP | 2002182638 A * | 6/2002 |
| JP | 2002-366103 A | 12/2002 |
| JP | 2003-150145 A | 5/2003 |
| JP | 2003-167727 A | 6/2003 |
| JP | 2003-331301 A | 11/2003 |
| JP | 2004013610 A | 1/2004 |
| JP | 2004-110719 | 4/2004 |
| JP | 2004-118384 | 4/2004 |
| JP | 2005-539323 | 12/2005 |
| WO | WO03/042818 A1 | 5/2003 |
| WO | WO2004/027709 A2 | 4/2004 |

* cited by examiner

IMAGE BEFORE CONVERSION

FIG. 6B

VERTICAL FLIP PROCESS

FIG. 6C

HORIZONTAL FLIP PROCESS

FIG. 6D

ROTATION PROCESS

FIG. 6E

ENLARGEMENT
PROCESS

FIG. 6F

CONTRACTION
PROCESS

FIG. 6G

PSEUDO SEMI-
TRANSPARENT
PROCESS 1

FIG. 6H

PSEUDO SEMI-
TRANSPARENT
PROCESS 2

MOBILE COMMUNICATION TERMINAL

TECHNICAL FIELD

The present invention relates to a mobile communication terminal, such as a mobile phone, which can display an image designated by an application program in execution.

BACKGROUND ART

Conventionally, as this type of mobile communication terminal, a mobile phone is known that is capable of executing an application program written in a platform-independent, object-oriented programming language such as JAVA (registered trademark) (see patent document 1, for example). In such a mobile phone, a user downloads his/her desired application program from a server in a mobile communication network and registers the application program on the mobile phone. By the user starting and executing the registered application program, the user can execute various functions on the mobile phone. The functions of the mobile phone by execution of an application program include an image conversion function to horizontally or vertically flip an image displayed on a display and rotate the image in units of 90 degrees according to the contents of an image conversion designation by the application program in execution.

Patent document 1: Japanese Unexamined Patent Application Publication No. 2000-347867

However, in the aforementioned conventional mobile communication terminal, the image conversions that can be executed by designation by an application program are of three types of horizontal image flipping, vertical image flipping, and an image rotation, and other image conversions cannot be carried out.

Accordingly, it would be desirable to provide a mobile communication terminal that can execute, by designation by an application program, novel image conversions that cannot be executed in the conventional mobile communication terminal.

SUMMARY OF THE INVENTION

A mobile communication terminal according to the present invention is a mobile communication terminal comprising displaying means that displays an image, image display controlling means that controls the displaying means, and application program execution managing means that manages execution of an application program, wherein the application program execution managing means has an image data storage unit that stores image data subject to image conversion process and a drawing data storage unit that stores drawing data to display an image on a screen of the displaying means, and the image display controlling means controls the displaying means so as to display an image formed of the drawing data stored in the drawing data storage unit on the screen of the displaying means, based on an image display instruction received from the application program execution managing means, and the mobile communication terminal is characterized by comprising image conversion processing means that can selectively execute, based on conversion-contents designating information received from the application program execution managing means, at least one drawing-type image conversion process of an enlargement process, a contraction process, and a pseudo semi-transparent process for partial hiding by use of a transmissive mask pattern, for the image data subject to image conversion process stored in the image data storage means; the application program execution managing means sends conversion-contents designating information designated by an application program in execution to the image conversion processing means, generates the drawing data from image data after a conversion process returned from the image conversion processing means, and stores the same in the drawing data storage unit.

In the mobile communication terminal, the application program execution managing means sends conversion-contents designating information designated by an application program in execution to the image conversion processing means.

The image conversion processing means executes, based on the conversion-contents designating information received from the application program execution managing means, at least one drawing-type image conversion process of an enlargement process, a contraction process, and a pseudo semi-transparent process for partial hiding by use of a transmissive mask pattern, for the image data subject to image conversion process stored in the image data storage means.

The application program execution managing means generates the drawing data from image data after a conversion process returned from the image conversion processing means, and stores the same in the drawing data storage unit.

The image display controlling means controls the displaying means based on an image display instruction received from the application program execution managing means. By this control, an image after a conversion formed of the drawing data stored in the drawing data storage unit is displayed on the screen of the displaying means.

As in the above, based on the conversion-contents designating information designating the contents of an image conversion by an application program in execution, at least one drawing-type image conversion of an enlargement process, a contraction process, and a pseudo semi-transparent process which cannot be carried out by the conventional mobile communication terminal is executed, and an image after the conversion can be displayed on the displaying means.

In the aforementioned mobile communication terminal, it is preferable that the image conversion processing means is configured so as to be able to execute at least one effect-type image conversion process of a lightness adjustment process, a color-tone reverse process, a monochrome process, a grayscale process, a single-color process, and a transmissive image process for synthesizing with a transmissive mask image for image data subject to image conversion process stored in the image data storage means.

In a case of the mobile communication terminal, the image conversion processing means executes, based on conversion-contents designating information received from the application program execution managing means, the effect-type image conversion process for image data subject to image conversion process stored in the image data storage means. The foregoing effect-type image conversion process is at least one process of a lightness adjustment process, a color-tone reverse process, a monochrome process, a grayscale process, a single-color process, and a transmissive image process for synthesizing with a transmissive mask image.

The application program execution managing means generates the drawing data from image data after a conversion process returned from the image conversion processing means, and stores the same in the drawing data storage unit.

The image display controlling means displays, based on an image display instruction received from the application program execution managing means, an image after a conversion formed of the drawing data stored in the drawing data storage unit on the screen of the displaying means.

As in the above, based on the conversion-contents designating information designating the contents of an image conversion by an application program in execution, the effect-type image conversion is executed, and an image after the conversion can be displayed on the displaying means.

Therefore, according to the mobile communication terminal, not only the drawing-type conversion process, but also at least one effect-type image conversion process of a lightness adjustment process, a color-tone reverse process, a monochrome process, a grayscale process, a single-color process, and a transmissive image process can be executed by designation by an application program in execution.

Moreover, in the aforementioned mobile communication terminal, it is preferable that the application program execution managing means is configured so as to be able to execute, based on the conversion-contents designating information, a first process involving the drawing-type image conversion process and a second process involving the effect-type image conversion process independently of each other; the first process is a process to send the conversion-contents designating information to the image conversion processing means, generate the drawing data from image data after a conversion returned from the image conversion processing means, without storing the image data after a conversion in the image data storage unit, and store the drawing data in the drawing data storage unit; and the second process is a process to send the conversion-contents designating information to the image conversion processing means, once store image data after a conversion returned from the image conversion processing means in the image data storage unit, generate the drawing data from the image data after conversion read out from the image data storage unit, and store the drawing data in the drawing data storage unit.

In the first process involving the drawing-type image conversion processing of the mobile communication terminal, image data after a conversion is not stored in the image data storage unit but drawing data is generated from the image data after a conversion. Accordingly, a process from an image conversion to an image display can be speedily carried out when an image is changed in real time during execution of an application program. In addition, in a second process involving the effect-type image conversion process, image data after a conversion is once stored in the image data storage unit and then drawing data is generated from the image data after a conversion read out from the image data storage unit. Accordingly, the image data after a conversion stored in the image data storage unit can be used as image data subject to re-conversion process.

Therefore, according to the mobile communication terminal, a process from a drawing-type image conversion to an image display can be speedily carried out when an image is changed in real time during execution of an application program. Moreover, the image data after an effect-type image conversion can be used as image data subject to re-conversion process.

Note that the aforementioned "image data" subject to image conversion include image data stored in a data storage means of a mobile communication terminal, image data stored in an external storage device such as a memory card mounted on a mobile communication terminal, and image data incorporated in an application program. In addition, the aforementioned "image data" subject to image conversion may include image data of an image taken by a camera unit provided in a mobile communication terminal and image data stored in a server accessible by a mobile communication terminal via a communication network.

Note that the aforementioned "mobile communication terminals" include mobile phones of the PDC (Personal Digital Cellular) system, the GSM (Global System for Mobile Communications) system, the TIA (Telecommunications Industry Association) system, and the like, mobile phones standardized by IMT (International Mobile Telecommunications)-2000, mobile phones of the TD-SCDMA (MC: Multi Carrier) system which is one of the TD-SCDMA (Time Division Synchronous Code Division Multiple Access) systems, PHSs (Personal Handyphone Systems), and phones, such as car phones, that are capable of executing application programs. The "mobile communication terminals" also include, in addition to the aforementioned phones, mobile communication terminals with no phone functionality such as PDAs (Personal Digital Assistance).

Control and image conversion process on the mobile communication terminal can also be realized by allowing a computer provided to the mobile communication terminal to execute a predetermined program. Passing of a program used on the computer may be performed using a recording medium, such as an FD or a CD-ROM, having stored thereon a program as digital information, or may be performed using a communication network such as a computer network.

According to the present invention, at least one new drawing-type conversion process of the enlargement process, contraction process, and pseudo semi-transparent process that cannot be executed in the conventional mobile communication terminal can be executed by designation by an application program in execution.

DETAILED DESCRIPTION OF VARIOUS EMBODIMENTS

Embodiments in which the present invention is applied to a mobile phone serving as a mobile communication terminal will be explained below.

Figure 1:
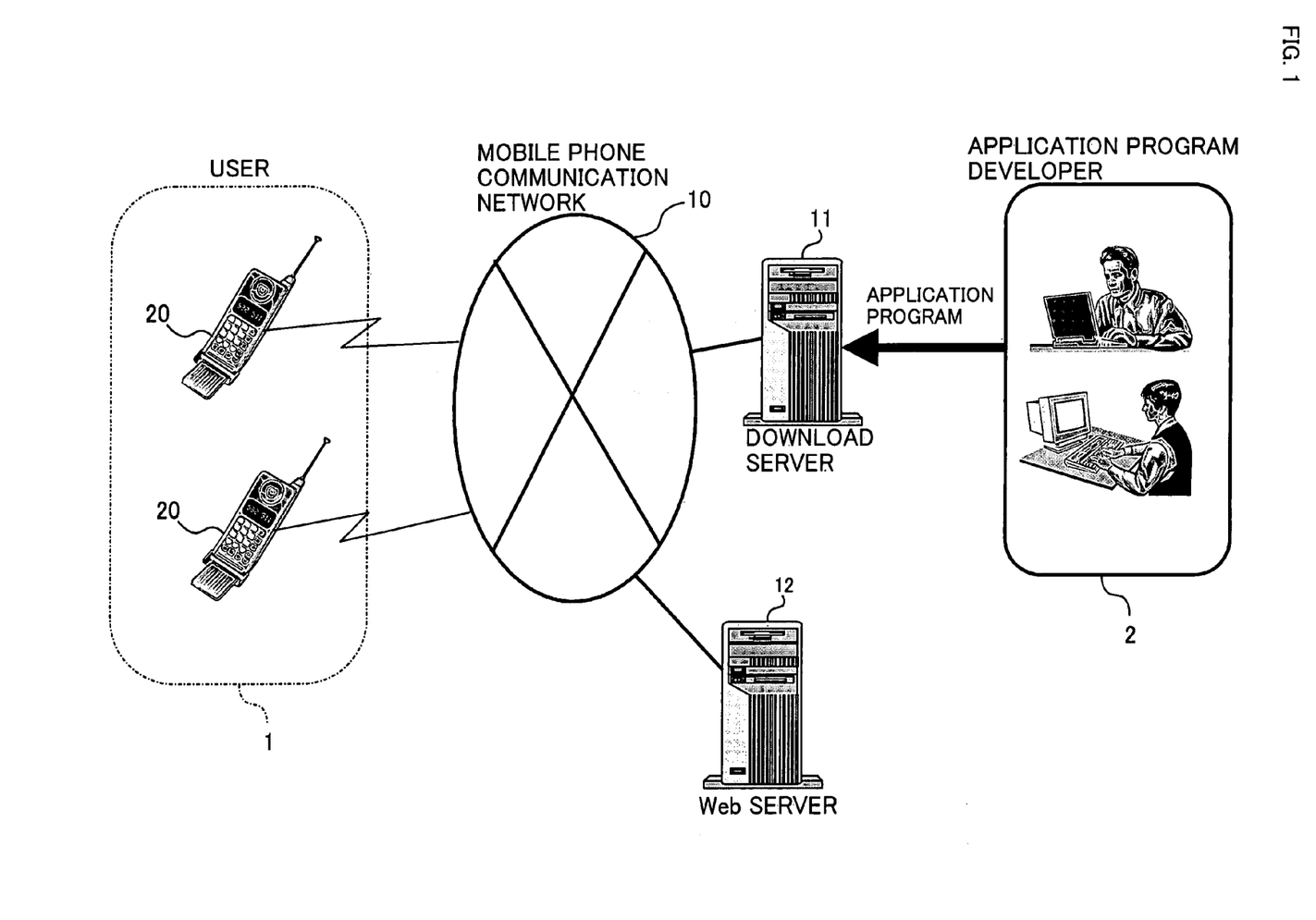
FIG. 1 is an illustrative diagram showing a main portion of a mobile communication system using a mobile phone according to an embodiment of the present invention.

FIG. 1 is an illustrative diagram showing a main portion of a mobile communication system using mobile phones 20 according to the present embodiment. In the mobile communication system, a mobile phone 20 used by a user 1 has a configuration capable of executing application programs developed by platform-independent object-oriented programming. Such application programs include those written in program languages such as JAVA (registered trademark), C, C++, and the like. The execution environment of such application programs is built by middleware such as the virtual machine (VM: Virtual Machine) of JAVA (registered trademark) or BREW (registered trademark). Such application programs may be ones pre-installed in the mobile phone 20 or may be ones downloaded from a download server via a mobile phone communication network being a communication network and stored and registered in the mobile phone 20.

In addition, the mobile phone 20 can be connected to a mobile phone communication network 10 serving as a communication network. To the mobile phone communication network 10 is connected an application program download server (hereinafter referred to as the "download server") 11 serving as a program providing server. In addition, to the mobile phone communication network 10 are connected not only the download server 11, but also a Web server 12, an information providing server, a location registering server, and a mail server, etc., which are not shown. Note that these servers may be configured as a single server. Note also that these servers may be configured as dedicated control devices having different configurations, or may be configured using a general-purpose computer system. Alternatively, each server may be configured using a single computer or may be configured by connecting, via a network, a plurality of computers each having a plurality of functions.

The download server 11 sends, upon receiving a download request from the mobile phone 20, an application program according to the request to the mobile phone 20. The Web server 12 sends, upon receiving a browse request from the mobile phone 20, a Web page screen which is a browse screen according to the request, to the mobile phone 20.

An application program provided from the download server 11 is provided from an application program developer 2. Specifically, for example, an application program is uploaded via a leased line or a public line to the download server 11 from a personal computer or the like on the side of the application program developer 2, and thereby the application program is provided. Note that an application program may be provided such that a recording medium, such as an optical disk or a magnetic disk, having recorded thereon a developed application program is sent from the application program developer 2 to a communication common carrier who manages and runs the download server 11 and then the application program on the recording medium is read by the download server 11. The application program thus provided is registered on the download server 11 in a state such that the mobile phone 20 can download the application program via the mobile phone communication network 10.

The aforementioned location registering server is a server that registers and manages information on a current position where each mobile phone 20 is located, that is, location information on a location registering management area where each mobile phone 20 is located. The location registering management area may be an area formed of one cell under control of a base station that has radio communication with each mobile phone 20 or may be an area where a plurality of adjacent cells are managed as one group. A typical size of one location registering management area is a few kilometers to a few hundred kilometers. Location registration of each mobile phone 20 into the aforementioned location registering server is carried out at power-on, periodically, and every time when the cell where the mobile phone 20 is located changes.

The aforementioned information providing server distributes, via the base station of each location registering management area, various types of information such as regional information, location information (latitude, longitude, and address) of a relevant location registering management area, and contents information by a predetermined communication channel. To the communication channel through which various types of information have been transmitted as such, by the mobile phone 20 executing a receiving operation at a predetermined timing, the information transmitted through the communication channel can be obtained and stored in an internal memory being an information storage means. The receiving operation to each communication channel can be executed at a timing set by an initial setting beforehand or at a timing set by a user. The receiving operation may be executed periodically or non-periodically.

The aforementioned mail server forwards data of an email message transmitted by each mobile phone 20 to the next mail server or receives, stores, and manages an email message sent to each mobile phone 20 and transmits data of the received email message to each mobile phone in response to an email message acquisition request of each mobile phone 20.

Figure 2:
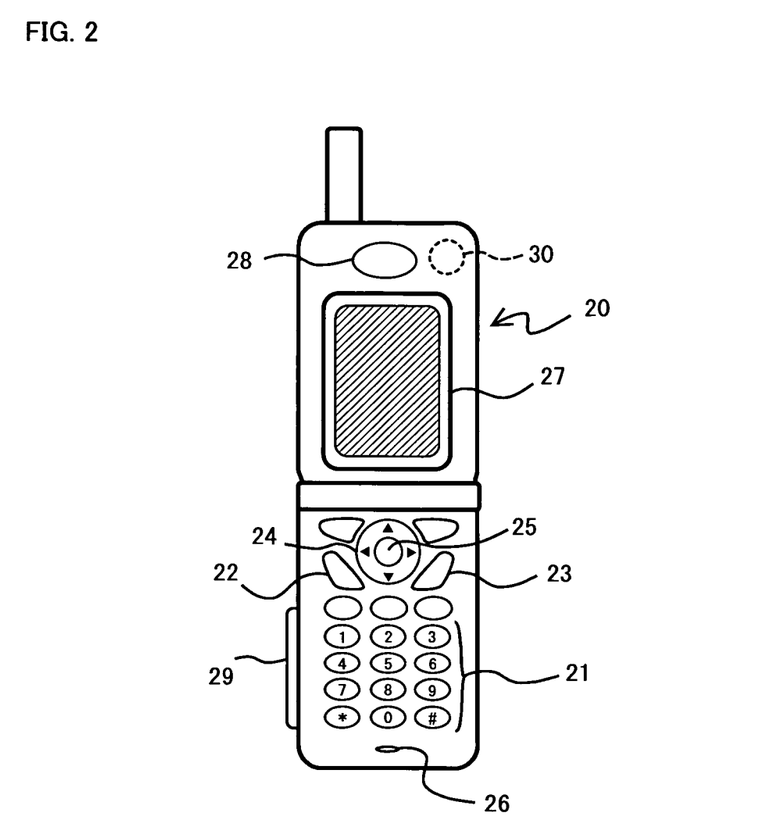
FIG. 2 is an external view of the mobile phone.
Figure 3:
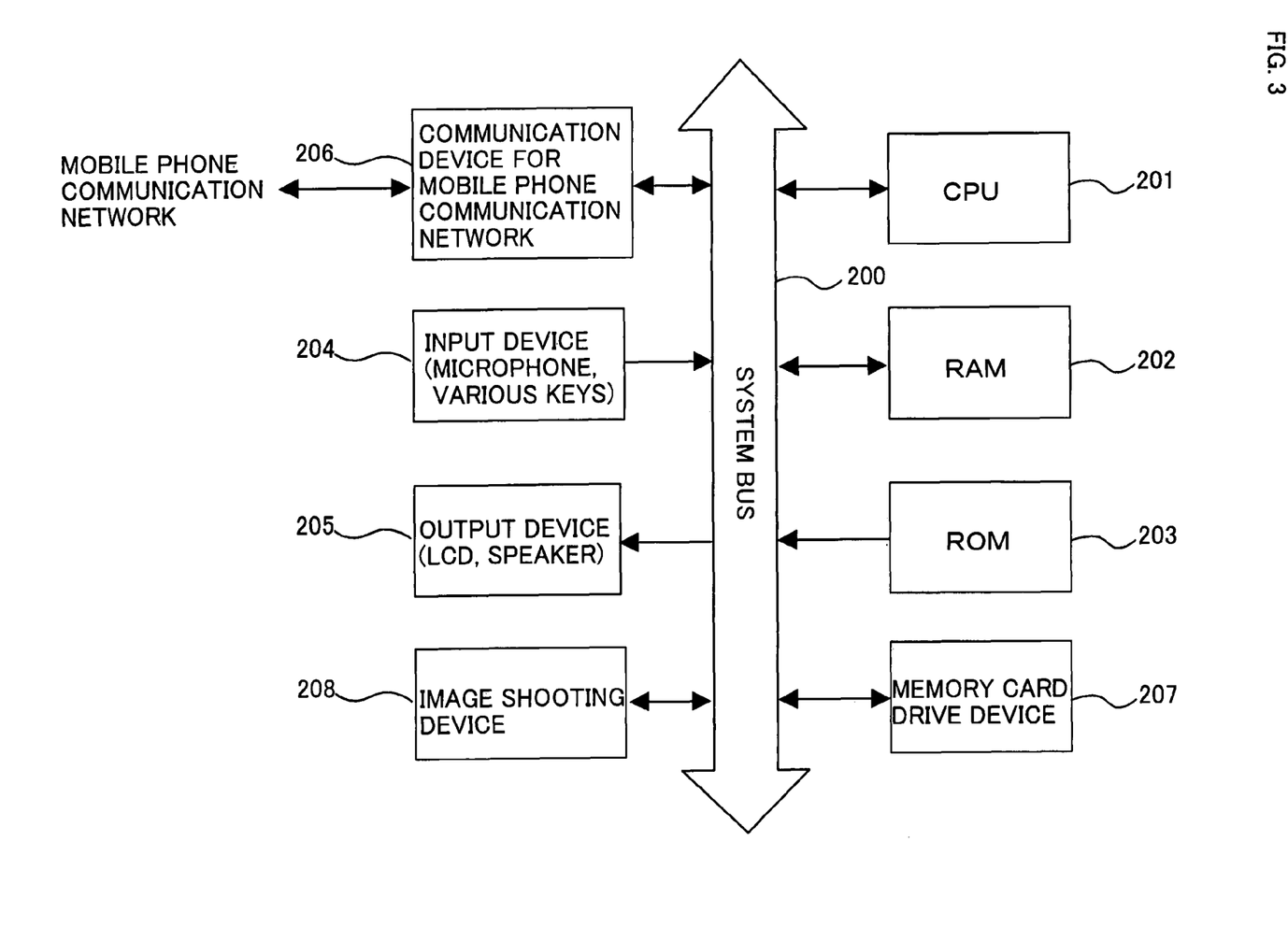
FIG. 3 is a schematic configuration diagram showing a hardware configuration of the mobile phone.

FIG. 2 is an external view of the mobile phone 20 and FIG. 3 is a schematic configuration diagram showing a hardware configuration of the mobile phone 20.

The mobile phone 20 is a clam-shell (folding) type mobile phone, and includes a system bus 200; a CPU 201; a data storage unit composed of a RAM 202, ROM 203, and the like; an input device 204; an output device 205; a communication device 206 for a mobile phone; a memory card drive device 207; and an image shooting device 208 being an image shooting means. The components such as the CPU 201 and the RAM 202 exchange with each other various data, instructions of a program which will be described later, etc., via the system bus 200. The input device 204 is composed of data entry keys (a numeric keypad, a * key, and a # key) 21, a call start key 22, a call end key 23, a scroll key 24, a multifunction key 25, a microphone 26, and the like. The output device 205 is composed of a liquid crystal display (LCD) 27 serving as a display means, a speaker 28, and the like.

The communication device 206 for a mobile phone establishes communications with other mobile phones or the aforementioned server 11 and the like via the mobile phone communication network 10. The communication device 206 for a mobile phone, for example, exchanges email messages with other mobile phones via the mobile phone communication network 10, or establishes a connection to an external communication network, such as the Internet, from the mobile phone communication network 10 via a gateway server and exchanges emails on the Internet. Furthermore, the communication device 206 for a mobile phone is also used to download, via the mobile phone communication network 10, an application program provided by the download server 11, and is also used as an information reception means for receiving distributed information including location information about the current location.

By operating an operating unit including the numeric keypad 21, the call start key 22, the call end key 23, and the like, which can be operated by the user 1, the user can input data, such as a URL, to the mobile phone 20, can start and end a call upon incoming call, or can select, start, and stop an application program. Further, by the user operating the operating unit, the user can download and register an application program from the download server 11, or can select and execute the registered application program. Moreover, by the user operating the operating unit, information received from the information providing server in the mobile phone communication network 10 can be displayed.

An output unit including, for example, an output device composed of the liquid crystal display (LCD) 27, the speaker 28, and the like is used to display on the liquid crystal display (LCD) 27 a Web page screen received via the mobile phone communication network 10, or to notify the user that incoming information has been received from the mobile phone communication network 10. Specifically, upon receiving such information, an incoming-information notification image is displayed on the liquid crystal display (LCD) 27 of the output unit, or a ring tone is outputted from the speaker 28. The output unit is also used to provide, during the execution of the aforementioned application program such as a game, a display of an image or an output of sound related to the program execution, and is also used to display information received from the information providing server.

The memory card drive device 207 has a mechanism that makes a memory card 29 mountable and demountable and an interface unit that transmits and receives data via a terminal that contacts an electrode terminal of the memory card 29.

As the image shooting device 208, for example, a CCD (Charge Coupled Device) camera or a CMOS camera can be used. An artificial retina camera provided with a signal processing function capable of high-speed imaging or a camera having sensitivity in a wavelength region of light other than visible rays such as infrared rays and gamma rays may be used according to the using environment. A camera lens unit 30 of the image shooting device 208 is provided at a rear surface opposite the front surface where the liquid crystal display (LCD) 27 is located. The image shooting device 208 is used for taking images of persons, scenery, and the like or taking a code image by a close-up function.

Figure 4:
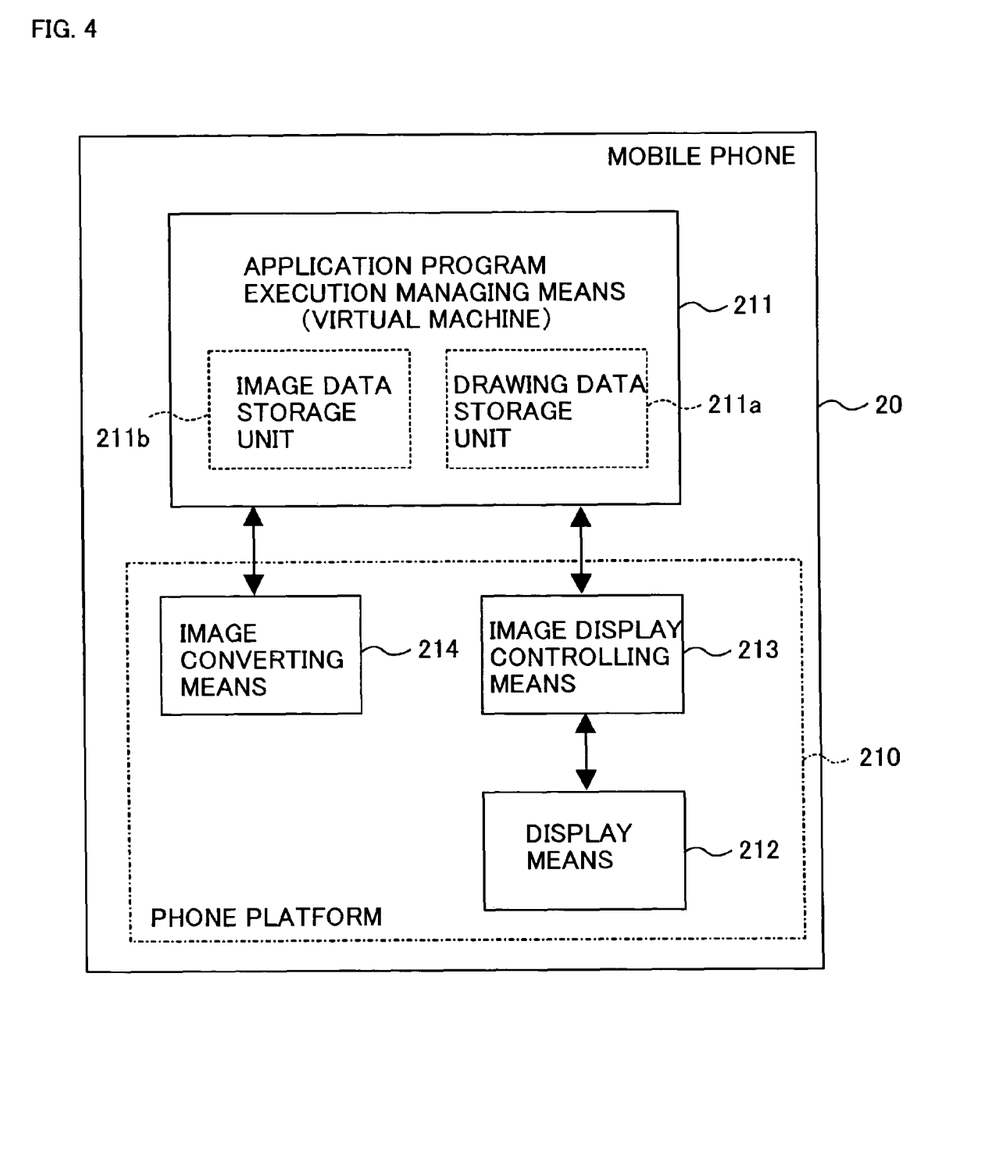
FIG. 4 is a functional block diagram showing an extracted main portion of the mobile phone.
Figure 5:
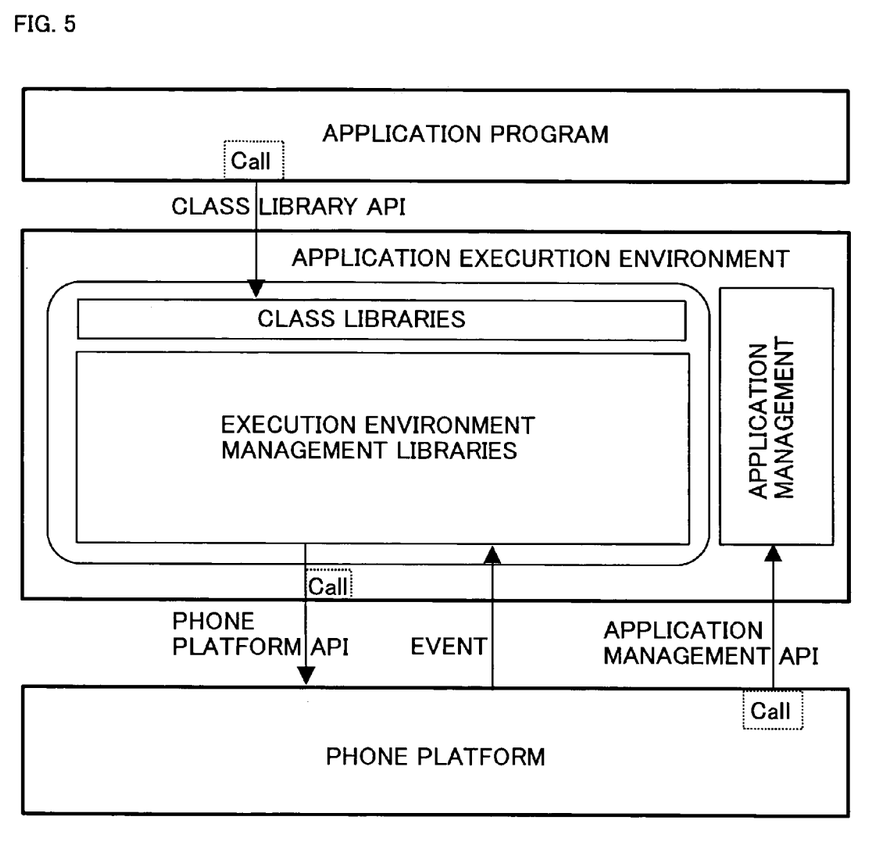
FIG. 5 is an illustrative diagram of a software structure of the mobile phone.

FIG. 4 is a functional block diagram showing an extracted main portion of the mobile phone 20 according to the present embodiment and FIG. 5 is an illustrative diagram of a software structure of the mobile phone 20.

The mobile phone 20 includes an application program execution managing means (application program execution managing unit) 211, a displaying means 212 that displays an image, an image display controlling means 213 that controls the displaying means 212, and an image conversion processing means 214. Of the plurality of these means, the displaying means 212, the image display controlling means 213, and the image conversion processing means 214 are provided in a phone platform 210 on a native side of the mobile phone. The mobile phone 20 realizes various functions of the application program execution managing means 211, the image display controlling means 213, and the image conversion processing means 214 by executing a predetermined program on a hardware composed of a CPU, etc.

The application program execution managing means 211 includes the system bus 200, the CPU 201, the RAM 202, and the like. The application program execution managing means 211 is also called a virtual machine and corresponds to the "program execution environment" shown in the center of the software structure in FIG. 5. The application program execution managing means 211 provides software, such as a class library, an execution environment management library, and an application management, which is used for an application program developed by object-oriented programming, and manages the execution environment of the application program.

The application program can be used by calling, via a class library API (application interface), a class library of functions, etc., in the aforementioned program execution environment. The history of calls to the class library of functions, etc., is held until a virtual execution environment (virtual machine: VM) for the application program is terminated.

The execution environment management library in the program execution environment can be used by calling, via a phone platform API, a phone platform library in a phone platform, as will be described later.

The application program execution managing means 211 has a drawing data storage unit 211*a* that temporarily stores drawing data to display an image on a screen of the displaying means 212 and an image data storage unit 211*b* that stores image data to which an image conversion process is applicable. The drawing data storage unit 211*a* and the image data storage unit 211*b* are set in a memory region called a heap memory used in the application program execution managing means 211. The drawing data stored in the drawing data storage unit 211*a* is data that is directly used to display an image on the screen of the displaying means 212 and is composed of a plurality of pieces of data corresponding to each pixel of the screen.

The displaying means 212 includes the liquid crystal display (LCD) 27 and can display various images. This can display, for example, images corresponding to image data stored in the internal memory (RAM 202) of the mobile communication terminal and image data stored in the external storage device such as a memory card 29. It can also display images taken by the image shooting device 208 and images corresponding to image data stored in the Web server 12 and the like accessible via the mobile phone communication network 10. Furthermore, it can also display images corresponding to image data incorporated in an application program executed by the application program execution managing means 211 and images after conversion processing to be described later has been carried out.

The image display controlling means 213 includes the system bus 200, the CPU 201, the RAM 202, and the like. The image display controlling means 213 controls, based on an image display instruction received from the application program execution managing means 211, the displaying means 212 based on drawing data stored in the drawing data storage unit 211*a* of the application program execution managing means 211 and displays an image formed of the drawing data on the displaying means 212.

The image conversion processing means 214 includes the system bus 200, the CPU 201, the RAM 202, and the like. The image conversion processing means 214 executes various types of image conversion processes for image data read out from the image data storage unit 211*b* of the application program execution managing means 211. The image data after the image conversion process has been executed by the image conversion processing means 214 is returned again to the application program execution managing means 211. The image data returned to the application program execution managing means 211 is used to generate drawing data after being again stored in the image data storage unit 211b or is directly used to generate drawing data without being stored in the image data storage unit 211b according to the type of image conversion process.

The image conversion process that can be executed by the image conversion processing means 214 includes a drawing-type image conversion process and an effect-type image conversion process.

Figure 6A:
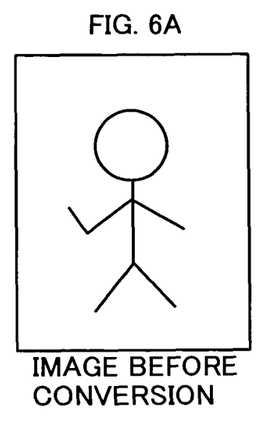
FIG. 6A is an illustrative diagram of a display mode of an image before an image conversion process.
Figure 6B:
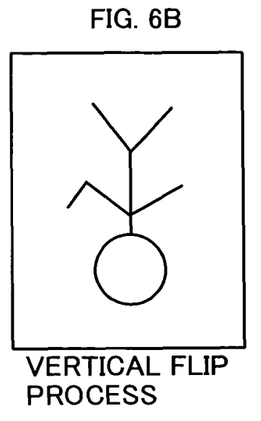
FIG. 6B is an illustrative diagram for exemplifying an image display mode after a vertical flip process has been carried out for the image in FIG. 6A.
Figure 6C:
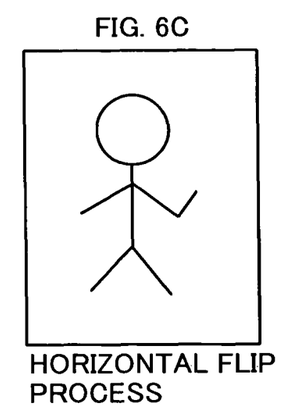
FIG. 6C is an illustrative diagram for exemplifying an image display mode after a horizontal flip process has been carried out for the image in FIG. 6A.
Figure 6D:
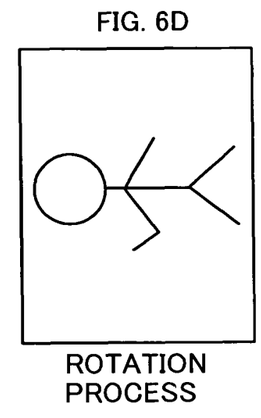
FIG. 6D is an illustrative diagram for exemplifying an image display mode after a rotation process has been carried out for the image in FIG. 6A.
Figure 6E:
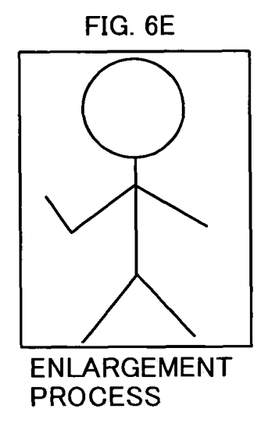
FIG. 6E is an illustrative diagram for exemplifying an image display mode after an enlargement process has been carried out for the image in FIG. 6A.
Figure 6F:
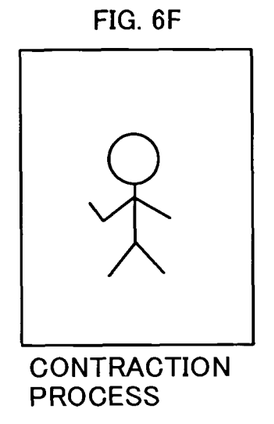
FIG. 6F is an illustrative diagram for exemplifying an image display mode after a contraction process has been carried out for the image in FIG. 6A.
Figure 6G:
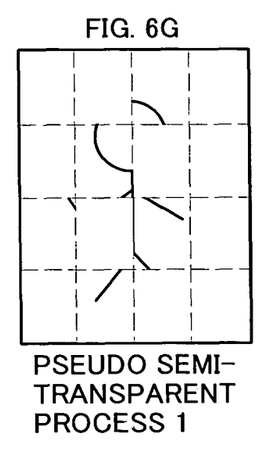
FIG. 6G is an illustrative diagram for exemplifying an image display mode after a pseudo semi-transparent process has been carried out for the image in FIG. 6A.
Figure 6H:
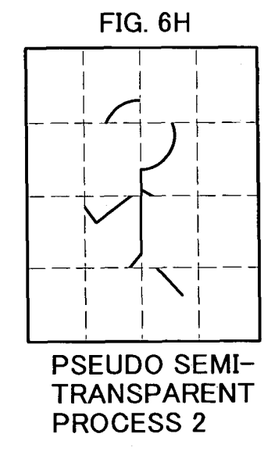
FIG. 6H is an illustrative diagram for exemplifying an image display mode after another pseudo semi-transparent process has been carried out for the image in FIG. 6A.

FIG. 6A to FIG. 6H are illustrative diagrams showing a drawing-type image conversion process. The drawing-type image conversion process includes, as shown in FIG. 6A to FIG. 6H, a vertical flip process, a horizontal flip process, a rotation process, an enlargement process, a contraction process, and a pseudo semi-transparent process. Of these image conversion processes, the pseudo semi-transparent process is a process that partially hides an image by use of a transmissive mask pattern. The example of a pseudo semi-transparent process shown in FIG. 6G is one for which an image is divided into 4×4 square sections, and a process is applied to every other section of the plurality of these sections so that a display part to display the original image and a hidden part not to display the original image are repeated. The example of a pseudo semi-transparent process shown in FIG. 6H is an example where the display parts and hidden parts by the pseudo semi-transparent process shown in FIG. 6G have been switched.

Table 1 exemplifies a portion of the methods defined by a class (GraphicsUtil) for the drawing-type image conversion process registered in the class library of the aforementioned program execution environment. Method 1 corresponds to the enlargement process and contraction process, whereby a conversion process to copy a short-form area in an Image object and expand and contract the same is carried out. Method 2 corresponds to the pseudo semi-transparent process, whereby a conversion process to tile a transmissive mask pattern on an Image object for drawing is carried out.

TABLE 1

GraphicsUtil Class

| Method | Outline of conversion process |
| --- | --- |
| 1 public static void drawRegion(Graphics g, Image src, int x__src, int y__src, int width, int height, int transform, int x__dest, int y__dest, int width__dest ,int height__dest, int anchor, int stretch quality) | Copy a short-form area in an Image object and expand and contract the same. |
| 2 public static void drawPseudo TransparentImage (Graphics g, Image src, int x__dest, int y__dest, int anchor, short mask__pattern, int element__size) | Tile a transmissive mask pattern on an Image object for drawing. |

The aforementioned effect-type image conversion process includes a lightness adjustment process, a color-tone reverse process, a monochrome process, a grayscale process, a single-color process, and a transmissive image process.

The lightness adjustment process is a process to change lightness, namely, brightness of an original image. The color-tone reverse process is a process to simultaneously reverse the tone, namely, brightness (darkness) of color and hue of an original image. For example, when the original image is in a flesh color, this is converted to a blue image, and when the original image is a monochrome image, this is converted to a negative/positive-reversed image. The monochrome process is a process to convert an original image to an image binarized in monochrome two-tone. The grayscale process is a process to convert an original image to a monochrome image with multiple tone (for example, 256 tone) equal to or more than three tones. The single-color process is a process to convert an original image to an image with a single color such as red or blue. The transmissive image process is a process to convert an original image to a synthetic image synthesized with a transmissive mask image.

Table 2 exemplifies methods defined by a class for the effect-type image conversion process (ImageUtil) registered in the class library of the aforementioned program execution environment.

TABLE 2

GraphicsUtil Class

| Method | Outline of conversion process |
| --- | --- |
| 1 public static Image adjustBrightness(Image src, int brightness) | Generate a lightness-adjusted image. |
| 2 public static Image reverseColor(Image src) | Generate a color-reversed image. |
| 3 public static Image createMonotone(Image src, int thresholdLevel) | Generate an image binarized in monochrome two-tone. |
| 4 public static Image createGrayScale(Image src) | Generate a grayscale-processed image. |
| 5 public static Image overwrapColor(Image src, int thresholdLevel) | Generate a single-colored image. |
| 6 public static Image createMaskedImage(Image src, String maskFileName) | Generate a transmissive image by mask image file designation. |
| 7 public static Image createMaskedImage(Image src, byte[ ] bytes) | Generate a transmissive image by mask image file designation. |

The image conversion processing means 214 can selectively execute, based on conversion-contents designating information received from the application program execution managing means 211, at least one of the plurality of image conversion processes composed of the drawing-type image conversion process and effect-type image conversion process.

Moreover, the mobile phone according to the present embodiment includes an unillustrated main control unit. The main control unit exchanges control instructions or various data with the application program execution managing means 211 and other respective units, and performs control in cooperation with these units. The main control unit exists in the "phone platform" shown at the bottom of the software structure in FIG. 5, and executes a control program for controlling the phone communications or the like, and a user interface, or provides a phone platform library. The phone platform can execute various processes in an application program by sending an event to the execution environment management library in the program execution environment, or can call, via an application management API, software of the application management in the program execution environment and use the software.

A control program for building a phone platform which allows the mobile phone 20 to operate in accordance with a predetermined procedure is stored in the RAM 202 or the ROM 203. A basic OS (operating system) program, a program for building the program execution environment, and an application program are also stored in the RAM 202 or the ROM 203. And, these programs are called, when necessary, in a work area of the CPU 201 or of the RAM 202 and executed.

In the mobile phone 20 having the aforementioned configuration, to download an application program from the download server 11, the user 1 operates the keys of the operating unit to access the download server 11. By this, a download selection screen for selecting a downloadable application program is displayed on the display 27. Then, on the download selection screen, the user selects his/her desired application program using the scroll key 24 and presses the multifunction key 25, whereby the main control unit controls the communication device 206 for the mobile phone communication network to download the application program from the download server 11.

Specifically, in the present embodiment, an application program is composed of a JAD file (text data) that contains property information and a JAR file (binary data) that contains the main body of the program. The JAD file contains not only basic data such as an application name, an application version, an application's vendor name, and data of a URL indicating where the JAR file is stored, but also setting data indicating, for example, whether the application program is authenticated, whether the application program is used being connected to a network, or whether the application program is a resident application program. The JAD file also contains the URL (the address data of the distributor) of the official Web page where relevant information regarding the application program is disclosed. When the user's desired application program is selected on the download selection screen, the main control unit downloads only a JAD file in the application program. Thereafter, the main control unit 210 reads out from the JAD file data of a URL indicating where a JAR file is stored, accesses the URL, and downloads the JAR file. The application program consisting of the JAD and JAR files thus downloaded is stored in the RAM 102 by the main control unit 210.

When executing the application program thus downloaded, the user 1 operates the keys of the operating unit to allow an application selection screen for selecting an application program to be executed to be displayed on the display 27. On the application selection screen, by the user selecting his/her desired application program using the scroll key 24, and pressing the multifunction key 25, the application program execution managing means (application program managing unit) 211 reads out the JAR file and starts the application program. If necessary, the setting data of the JAD file may be referred to and an environment that performs a processing operation in accordance with the setting data may be set. When a particular processing operation is performed during the execution of the application program, the setting data of the JAD file regarding the processing operation is referred to, and a processing operation suitable for the application program is performed. The application programs include various application programs; for example, an application program that allows a user to enjoy a game, etc., by operating various keys of the operating unit, and a resident application program that allows a standby screen composed of a three-dimensional moving image to be displayed on the display 27.

Now, the image conversion function, which is the characterizing portion of the present invention, will be described.

Figure 7:
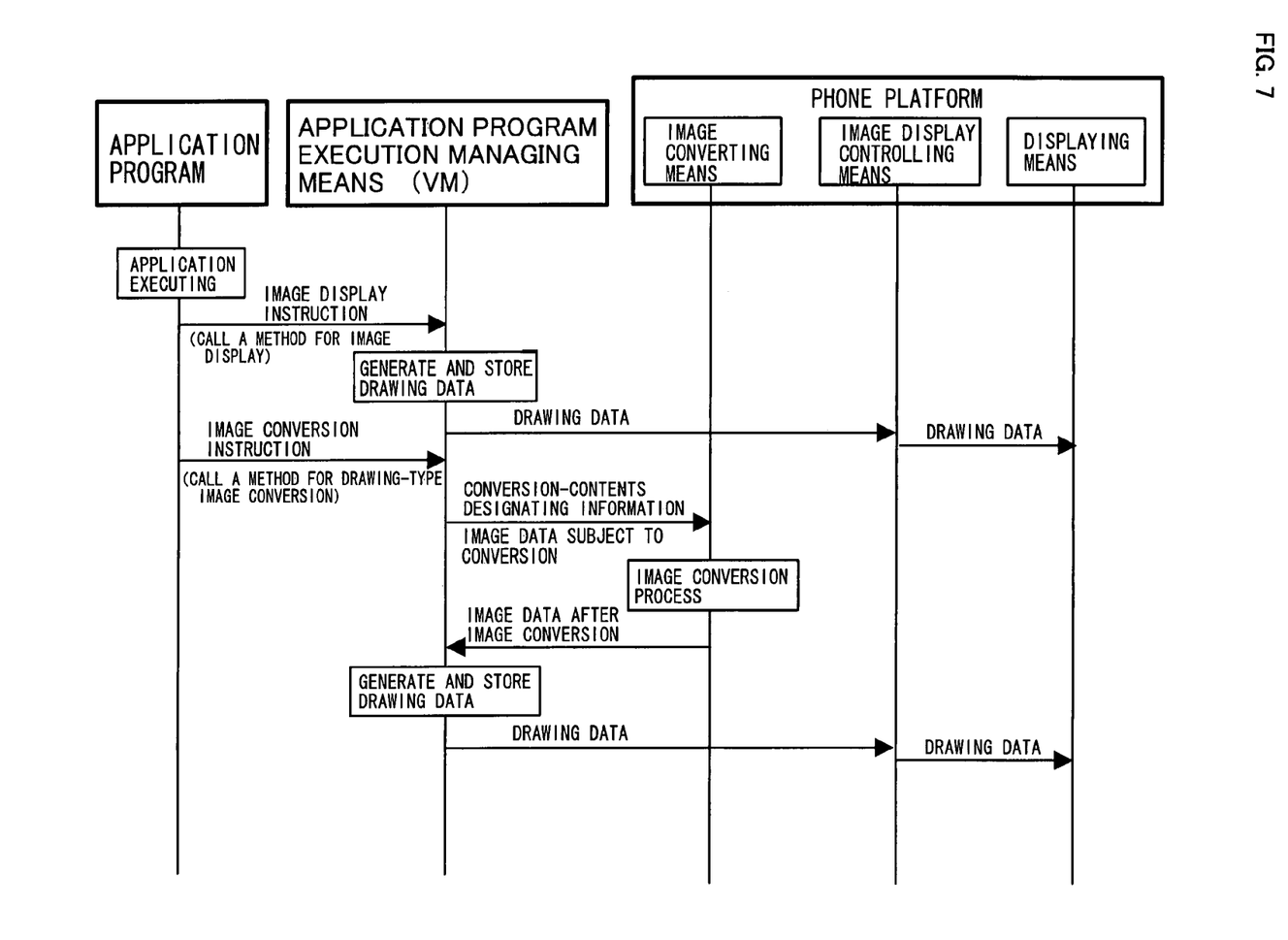
FIG. 7 is a sequence diagram showing a processing performed when an image is displayed by carrying out a drawing-type image conversion process during execution of an application program.

FIG. 7 is a sequence diagram showing an example of processing performed when an image is displayed by carrying out a drawing-type image conversion process during execution of an application program.

The user can select his/her desired application program from an application program list displayed on the displaying means 212 (liquid crystal display 27) of the mobile phone 20 and execute the selected application program. The application program is a program of image editing, a game, or the like that involves an image display and an image conversion during execution thereof.

First, when a conversion process of an image displayed on the displaying means 212 is carried out during the execution of the application program, an image subject to image conversion is displayed on the displaying means 212. Specifically, based on an image display instruction in the application program in execution, an image displaying method defined by an image displaying class is called. The image displaying method is composed of an image object generation method and a drawing method. By the image object generation method, an image object is generated concerning an image file subject to display. The image object includes image data to which a conversion process is applicable and is set in the image data storage unit 211*a* which is a part of the heap memory in the aforementioned application program execution managing means 211. By the drawing method, drawing data is generated concerning the image object and a drawing function on the phone platform (native) side is executed via the phone platform API. The image display controlling means 213 controls the displaying means 212 based on drawing data present in the drawing data storage unit 211*a* of the application program execution managing means 211. By the control, an image subject to conversion process is displayed on the displaying means 212.

Next, when a drawing-type image conversion process such as enlargement and contraction is carried out for an image displayed on the displaying means 212, a specific drawing-type image converting method defined by the drawing-type image conversion processing class (GraphicsUtil) is called based on an image conversion instruction in the application program in execution. By the drawing-type image converting method, conversion-contents designating information are sent to the image conversion processing means 214 on the phone platform (native) side via the phone platform API so as to execute a conversion processing function by the image conversion processing means 214. The image conversion processing means 214 carries out a predetermined image conversion process for image data present in the image data storage unit 211*b* of the application program execution managing means 211 based on the conversion-contents designating information. The image data after a conversion process is returned to the application program execution managing means 211.

The application program execution managing means 211 does not store the image data after a conversion process in the image data storage unit 211*b* but generates drawing data from the image data after a conversion process and stores the drawing data in the drawing data storage unit 211*a*. Then, the application program execution managing means 211 executes a drawing function on the phone platform (native) side via the phone platform API. The image display controlling means 213 on the phone platform side controls the displaying means 212 based on the drawing data present in the drawing data storage unit 211a of the application program execution managing means 211. By the control, an image after a conversion process is displayed on the displaying means 212.

Figure 8:
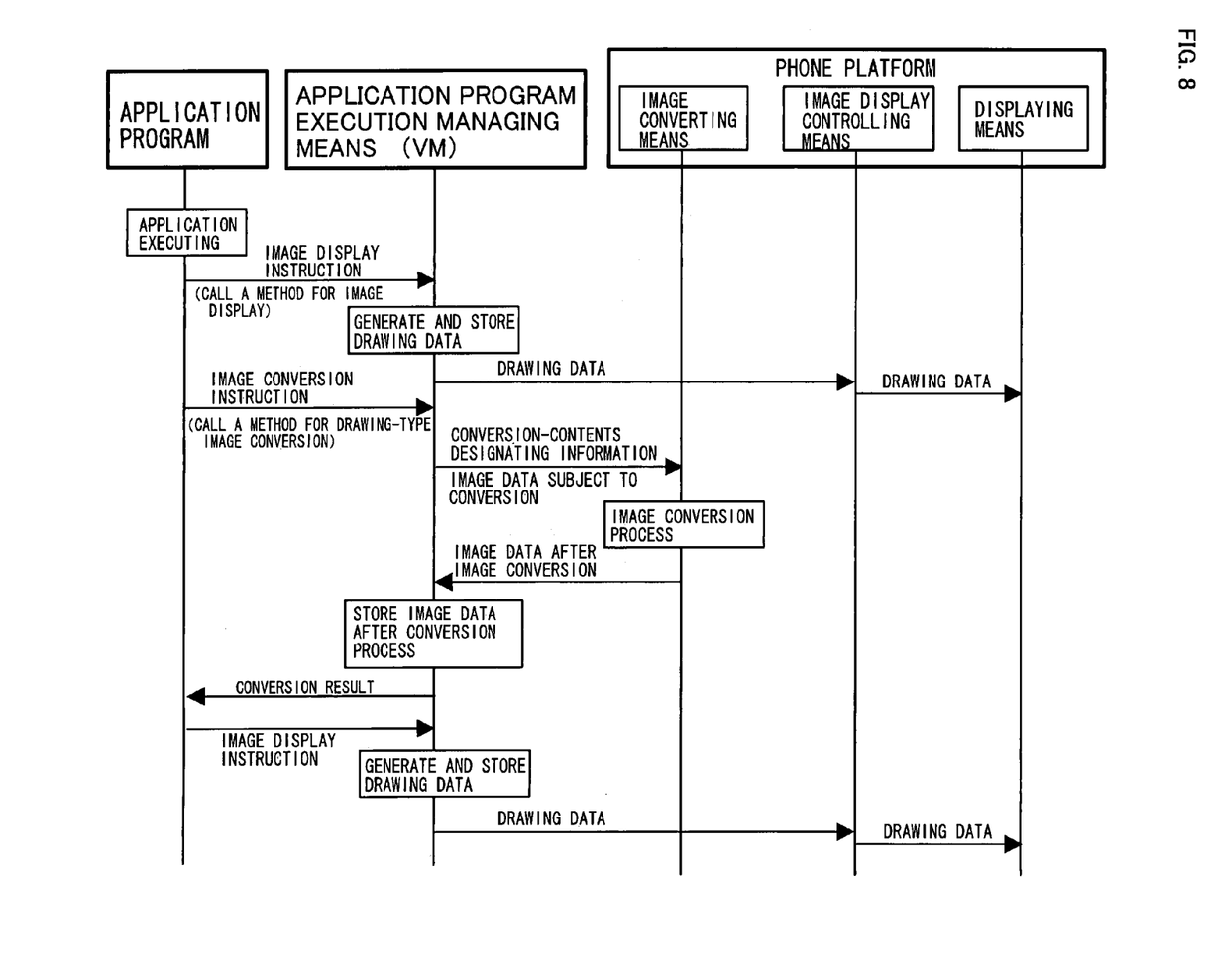
FIG. 8 is a sequence diagram showing a process performed when an image is displayed by carrying out an effect-type image conversion process during execution of an application program.

FIG. 8 is a sequence diagram showing a process performed when an image is displayed by carrying out an effect-type image conversion process during execution of an application program.

First, when a conversion processing of an image displayed on the display means 212 is carried out during execution of an application program, similar to the case of FIG. 7, an image subject to image conversion is displayed on the display means 212.

Next, when an effect-type image conversion process such as lightness adjustment is carried out for the image displayed on the displaying means 212, a specific effect-type image converting method defined by the effect-type image conversion processing class (ImageUtil) is called based on an image conversion instruction in the application program in execution. By the effect-type image converting method, conversion-contents designating information are sent to the image conversion processing means 214 on the phone platform (native) side via the phone platform API so as to execute a conversion processing function by the image conversion processing means 214. The image conversion processing means 214 carries out a predetermined image conversion process for image data present in the image data storage unit 211b of the application program execution managing means 211 based on the conversion-contents designating information. The image data after a conversion process is returned to the application program execution managing means 211 and is stored in the image data storage unit 211b as image data after a conversion process.

The application program execution managing means 211 stores the image data after a conversion process in the image data storage unit 211b and then notifies the application program of results of conversion resulting from the image conversion processing instruction. The application program that has received a conversion notification recognizes that the image data after a conversion process is image data of a later image subject to display and again instructs the application program execution managing means 211 to display an image.

The application program execution managing means 211 that has received the image display instruction generates drawing data from the image date after a conversion process stored in the image data storage unit 211b and stores the drawing data in the drawing data storage unit 211a. Then, the application program execution managing means 211 executes a drawing function on the phone platform (native) side via the phone platform API. The image display controlling means 213 on the phone platform side controls the displaying means 212 based on the drawing data present in the drawing data storage unit 211a of the application program execution managing means 211. By the control, an image after a conversion process is displayed on the displaying means 212.

As described above, according to the present embodiment, based on conversion-contents designating information designated by an application program in execution, at least one of a plurality of drawing-type image conversion processes including not only the conventional flip process and rotation process but also an enlargement process, a contraction process, and a pseudo semi-transparent process is selected and executed, and an image after the conversion can be displayed on the displaying means 212.

Furthermore, based on conversion-contents designating information designated by an application program in execution, at least one of a plurality of image conversion processes including not only the plurality of drawing-type image conversion processes but also a plurality of effect-type image conversion processes of a lightness adjustment process, a color-tone reverse process, a monochrome process, a grayscale process, a single-color process, and a transmissive image process is selected and executed, and an image after the conversion can be displayed on the displaying means 212.

In particular, according to the present embodiment, in a first process involving the drawing-type image conversion process such as enlargement or contraction, image data after a conversion is not stored in the image data storage unit 211b but drawing data is generated from the image data after a conversion. Accordingly, a process from an image conversion to an image display can be speedily carried out when an image is changed in real time during execution of an application program. In addition, in a second process involving the effect-type image conversion process such as a lightness adjustment, image data after a conversion is once stored in the image data storage unit 211b and then drawing data is generated from the image data after a conversion read out from the image data storage unit 211b. Accordingly, the image data after a conversion stored in the image data storage unit 211b can be used as image data subject to re-conversion process.

Although the preferred embodiments of the present invention have been explained, it is understood that various modifications may be made to the embodiments disclosed herein without departing from the scope or spirit of the present invention, and within the scope of the technical elements as set forth in the appended claims.

For example, although the aforementioned embodiments explain a mobile phone that can execute application programs developed by platform-independent object-oriented programming using a programming language such as JAVA (registered trademark), the present invention can be applied without being limited to the type of application program to be executed on the mobile phone, and the same advantageous effects can be obtained.

In addition, the present invention can be applied to any device as long as the device can execute application programs, and thus can be applied not only to phones, such as PHSs and car phones, but also to portable PDAs, and the same advantageous effects can be obtained.

The invention claimed is:

1. A mobile communication terminal, comprising:
a display that displays an image;
an image display controller that controls the display;
an application program execution manager that manages execution of an application program developed by platform-independent object-oriented programming, wherein the application program execution manager has an image data storage unit that stores image data subject to image conversion process and a drawing data storage unit that stores drawing data to display an image on a screen of the display, and wherein the image display controller controls the display so as to display an image formed of the drawing data stored in the drawing data storage unit on the screen of the display, based on an image display instruction received from the application program execution manager;
an image conversion processor that can selectively execute, based on conversion-contents designating information received from the application program execution manager, a conversion process, from among a plurality of conversion processes, on the image data subject to image conversion process stored in the image data storage unit to produce converted image data, wherein the plurality of conversion processes include a drawing-type image conversion process and an effect-type image conversion process, and a drawing data generating unit that generates the drawing data from the converted image data after the selected conversion process returns the converted image data from the image conversion processor, wherein the drawing data is stored in the drawing data storage, and wherein, when the selected conversion process includes the effect-type image conversion process, the converted image data is stored in the image data store unit before the drawing data generating unit generates the drawing data, and wherein, when the selected conversion process includes only the drawing-type image conversion process, the converted image data is not stored in the image data store unit.

2. The mobile communication terminal according to claim 1, wherein the effect-type image conversion process is selected from at least one of: a lightness adjustment process, a color-tone reverse process, a monochrome process, a grayscale process, a single-color process, and a transmissive image process for synthesizing with a transmissive mask image for image data subject to image conversion process stored in the image data storage unit.

3. The mobile communication terminal according to claim 1, wherein the drawing-type image conversion process is selected from at least one of: an enlargement process, a contraction process, and a pseudo semi-transparent process for partial hiding by use of a transmissive mask pattern.

4. The mobile communication terminal according to claim 1, wherein the selected conversion process includes the effect-type image conversion process, and wherein the converted image data that is stored in the image data store unit is accessible for a subsequent re-conversion process.

5. The mobile communication terminal according to claim 1, wherein the application program execution manager receives an image conversion instruction from the application program in execution.

6. A method for performing an image conversion on a mobile communication terminal, the mobile communication terminal including a display that displays an image, an image display controller that controls the display, an application program execution manager that manages execution of an application program developed by platform-independent object-oriented programming, wherein the application program execution manager has an image data storage unit that stores image data subject to image conversion process and a drawing data storage unit that stores drawing data to display an image on a screen of the display, and wherein the image display controller controls the display so as to display an image formed of the drawing data stored in the drawing data storage unit on the screen of the display, based on an image display instruction received from the application program execution manager, the method comprising:

receiving conversion-contents designating information from the application program execution manager;

selectively executing, based on the conversion-contents designating information, a conversion process, from among a plurality of conversion processes, on the image data subject to image conversion process stored in the image data storage unit to produce converted image data, wherein the plurality of conversion processes include a drawing-type image conversion process and an effect-type image conversion process;

generating the drawing data from the converted image data after the conversion process returns the converted image data from an image conversion processor;

storing the drawing data in the drawing data storage unit; and when the selected conversion process includes the effect-type image conversion process, storing the converted image data in the image data store unit before the drawing data generating unit generates the drawing data, and wherein, when the selected conversion process includes only the drawing-type image conversion process, the converted image data is not stored in the image data store unit.

7. The method according to claim 6, wherein the effect-type image conversion process is selected from at least one of: a lightness adjustment process, a color-tone reverse process, a monochrome process, a grayscale process, a single-color process, and a transmissive image process for synthesizing with a transmissive mask image for image data subject to image conversion process stored in the image data storage unit.

8. The method according to claim 6, wherein the drawing-type image conversion process is selected from at least one of: an enlargement process, a contraction process, and a pseudo semi-transparent process for partial hiding by use of a transmissive mask pattern.

9. The method according to claim 6, wherein the selected conversion process includes the effect-type image conversion process, and wherein the converted image data that is stored in the image store unit is accessible for a subsequent re-conversion process.

10. A non-transitory computer readable medium storing computer software for performing an image conversion on a mobile communication terminal, the mobile communication terminal including a display that displays an image, an image display controller that controls the display, an application program execution manager that manages execution of an application program developed by platform-independent object-oriented programming, wherein the application program execution manager has an image data storage unit that stores image data subject to image conversion process and a drawing data storage unit that stores drawing data to display an image on a screen of the display, and wherein the image display controller controls the display so as to display an image formed of the drawing data stored in the drawing data storage unit on the screen of the display, based on an image display instruction received from the application program execution manager, the computer software comprising:

executable code that receives conversion-contents designating information from the application program execution manager;

executable code that selectively executes, based on the conversion-contents designating information, a conversion process, from among a plurality of conversion processes, on the image data subject to image conversion process stored in the image data storage unit to produce converted image data, wherein the plurality of conversion processes include a drawing-type image conversion process and an effect-type image conversion process;

executable code that generates the drawing data from the converted image data after the conversion process returns the converted image data from an image conversion processor;

executable code that stores the drawing data in the drawing data storage unit; and executable code that, when the selected conversion process includes the effect-type image conversion process, storing the converted image data in the image data store unit before the drawing data generating unit generates the drawing data, and wherein, when the selected conversion process includes only the drawing-type image conversion process, the converted image data is not stored in the image data store unit.

11. The non-transitory computer readable medium according to claim 10, wherein the effect-type image conversion process is selected from at least one of: a lightness adjustment process, a color-tone reverse process, a monochrome process, a grayscale process, a single-color process, and a transmissive image process for synthesizing with a transmissive mask image for image data subject to image conversion process stored in the image data storage unit.

12. The non-transitory computer readable medium according to claim 10, wherein the drawing-type image conversion process is selected from at least one of: an enlargement process, a contraction process, and a pseudo semi-transparent process for partial hiding by use of a transmissive mask pattern.

13. The non-transitory computer readable medium according to claim 10, wherein the selected conversion process includes the effect-type image conversion process, and wherein the converted image data that is stored in the image store unit is accessible for a subsequent re-conversion process.

\* \* \* \* \*